United States Patent [19]

Weiss

[11] Patent Number: 5,097,505

[45] Date of Patent: * Mar. 17, 1992

[54] METHOD AND APPARATUS FOR SECURE IDENTIFICATION AND VERIFICATION

[75] Inventor: Kenneth P. Weiss, Newton, Mass.

[73] Assignee: Securities Dynamics Technologies, Inc., Cambridge, Mass.

[*] Notice: The portion of the term of this patent subsequent to Oct. 15, 2008 has been disclaimed.

[21] Appl. No.: 597,784

[22] Filed: Oct. 19, 1990

Related U.S. Application Data

[63] Continuation-in-part of Ser. No. 429,326, Oct. 31, 1989, Pat. No. 5,058,161, which is a continuation-in-part of Ser. No. 802,579, Nov. 27, 1985, Pat. No. 4,885,778, which is a continuation-in-part of Ser. No. 676,626, Nov. 30, 1984, Pat. No. 4,720,860.

[51] Int. Cl.$^5$ ............................................... H04K 1/00
[52] U.S. Cl. ............................................ 380/23; 380/25
[58] Field of Search .......................... 380/23, 24, 25, 28, 380/48

[56] References Cited

U.S. PATENT DOCUMENTS

| | | | |
|---|---|---|---|
| 4,509,093 | 4/1985 | Stellberger | 380/23 |
| 4,578,530 | 3/1986 | Zeidler | 380/24 |
| 4,599,489 | 7/1986 | Cargile | 380/23 |
| 4,720,860 | 1/1988 | Weiss | 380/23 |
| 4,731,841 | 3/1988 | Rosen et al. | 380/23 |
| 4,802,216 | 1/1989 | Irwin et al. | 380/23 |
| 4,819,267 | 4/1989 | Cargile et al. | 380/23 |
| 4,856,062 | 8/1989 | Weiss | 380/23 |
| 4,885,778 | 12/1989 | Weiss | 380/23 |
| 4,890,323 | 12/1989 | Beker et al. | 380/23 |
| 4,907,270 | 3/1990 | Hazard | 380/23 |

*Primary Examiner*—Thomas H. Tarcza
*Assistant Examiner*—David Cain
*Attorney, Agent, or Firm*—Wolf, Greenfield & Sacks

[57] ABSTRACT

A method and apparatus for performing personal identification and/or verification at perdetermined stations or checkpoints is provided. Each person to be identified has a unit such as a card, badge or other token or device which stores a predetermined coded value, at least a predetermined portion of which is changed at selected time intervals in accordance with an algorithm, the algorithm being such that the value of the predetermined portion of the stored coded value at any given time is nonpredictable. The unit has a triggering signal generator, the unit being responsive to the triggering signal to present an indication of the current stored coded value to the station, the station responding to the predetermined coded value for identifying the person. Triggering may be in response to detection of a predetermined beacon from the station, in response to a user keypad input or may be periodically generated. Security may be enhanced by the person inputting a unique PIN at the unit which PIN is utilized in generating the nonpredictable codes. The PIN input may also be used for triggering. Verification may be achieved by including a public code as part of the code which is presented from the unit which public code is not changed.

24 Claims, 3 Drawing Sheets

METHOD AND APPARATUS FOR SECURE IDENTIFICATION AND VERIFICATION

This patent application is a continuation-in-part of U.S. patent application Ser. No. 07/429,326, now U.S. Pat. No. 5,058,161, issued Oct. 15, 1991 the filing date of which is Oct. 31, 1989, entitled METHOD AND APPARATUS FOR SECURE IDENTIFICATION AND VERIFICATION, the specification of which is incorporated herein by reference. U.S. Ser. No. 07/429,326 is itself a continuation-in-part of Ser. No. 802,579 filed Nov. 27, 1985 now U.S. Pat. No. 4,885,778, issued on Dec. 5, 1989, which in turn, is a continuation-in-part of Ser. No. 676,626 filed Nov. 30, 1984, now U.S. Pat. No. 4,720,860 issued Jan. 19, 1988, the specifications of which are also incorporated herein by reference.

FIELD OF THE INVENTION

This invention relates to methods and apparatus for secure identification and verification and more particularly to such a system which permits identification or verification by the mere proximity to a checkpoint.

BACKGROUND OF THE INVENTION

In U.S. Pat. No. 4,720,S60, issued Jan. 19, 1988, and in U.S. Pat. No. 4,885,778, issued Dec. 5, 1989, systems are disclosed which permit the secure verification of an individual by providing the individual with a card displaying a unique nonpredictable or pseudorandom code for the individual which code changes at regular time intervals, for example each minute. With this system, the individual either (a) keys in the number appearing on his card and the system identifies the individual by recognizing this number as being one which is present for a person in the system at the given instant; or (b) the system provides verification by having the individual key in his personal identification number (PIN) or a public ID number which the system then uses to retrieve the nonpredictable code which should be present for the individual in the system. In an improved version of the system, described in copending application Ser. No. 07/341,932, filed Apr. 21, 1989, a personal password or personal identification number (PIN) is entered into the card by the user keying a keypad on the card and this PIN is utilized in generating the nonpredictable code. This further enhances security in that it makes it more difficult for someone other than the person to whom the card was issued to use the card, (requires two factors rather than only a single factor for security; something known and something possessed rather than only something possessed) and it also results in the PIN being transmitted to the verification station in a secure coded fashion so that the PIN cannot be surreptitiously observed, electronically eavesdropped or learned.

While the systems described in these patents and application provide a high level of security, they require that the user key in the number appearing on the card, which may be a five to ten digit number, in order to obtain identification or verification. While this is useful when the user is at a remote location, for example to gain access to a computer system by telephone or terminal, it can cause annoying delays when the user is for example trying to enter a physically secure facility where the user may have to enter his code three or four times to pass through various security barriers or checkpoints at the facility. It would therefore be desirable if the nonpredictable code could be available on a card, badge or other suitable device or unit carried by the user and be presented such that the code could be automatically sensed or read by the system, permitting the user to pass through various checkpoints without the need for keying in the current code appearing on the unit when the user reaches each such location. It would also be desirable if the location of an individual in the facility could be tracked without requiring any active input on the part of the user or with minimum active input.

While devices are currently available which permit a coded output to be obtained from a unit, these systems are used primarily for nonsecure applications such as identifying livestock, railroad cars, pallets or trucks. An example of such devices is the Nedap GIS RF identification system available from Nedap USA, Sunnyvale, Calif. Someone either gaining possession of such a device or capturing its electronic radiation could easily determine the code stored therein and surreptitiously generate such code. Any individual in possession of such device could also gain access to the facility even if such individual were not the individual to whom the unit was issued.

A need therefore exists for an improved identification and verification method and apparatus which provides highly secure identification and verification while permitting such verification or identification to be achieved with either no user input, or with the user inputting at most only a few, usually memorized, secret code characters, such as his PIN. If a PIN is entered, it is desirable that it need be entered only once to gain full access to the facility rather than being entered for each checkpoint, provided access is completed within a predetermined time period.

SUMMARY OF THE INVENTION

This invention provides a method and apparatus for performing identification and/or verification at a predetermined station or site. The person to be identified has a unit such as a card, badge or other token which stores a predetermined coded value, at least a predetermined portion of which is changed at selected time intervals in accordance with an algorithm, the algorithm being such that the value of the predetermined portion of the stored coded value at any given time is nonpredictable. The unit also has a triggering means, the unit being operative in response to the triggering means to automatically present an indication of the current stored coded value. At the station, there is a means which is automatically responsive to the produced coded value for identifying the person having the unit.

For one embodiment, the station generates a predetermined radiation beacon, the detection of which at the unit performs the triggering function. Detection at the unit may be accomplished with a tuned circuit which absorbs energy from an RF source at the frequency thereof. The currently stored coded value may be used to control the absorption state of the tuned circuit as the bits of the stored value are sequentially read out, or the sequentially read out coded bits may be utilized to control a transmitter. In either event, equipment at the station may automatically detect the current stored coded value at the unit. For another embodiment, the detection means is an ultrasonic detector, such as, for example, a piezoelectric crystal. For still another embodiment, triggering is caused by the person to be identified touching a predetermined area of the unit or keying in a coded value such as the person's PIN. Triggering may also occur automatically at selected time intervals in response to clock outputs or the like.

In an identification mode, a processor at the station compares the received current coded value with current coded values which are stored or generated for each person in the system, and identifies the person when a match is detected. If no match is detected, the person may be rejected for access to the facility or resource at the station. By placing transmitting and receiving equipment at a plurality of stations at a facility, the movements of persons through the facility may be tracked. In order to permit the system to be used for verification, some portion of the coded material is fixed to be used for a public ID or index.

The unit may also contain a keypad on which the user may input a short code, such as the person's personal identification number (PIN). The PIN is mixed with the changing nonpredictable code in the processor in accordance with a predetermined algorithm so that the correct current coded value will appear for a person only if the person has inputted the proper PIN into the unit. As previously indicated, such input may also be used for triggering. To permit the system to be used for verification, a selected number of bits in the coded value, for example the bits for six decimal digits or characters, may be fixed in a register, with the remaining bits being used to represent the generated nonpredictable code. The six characters represent a public ID code for the person which may be recognized by a station processor and utilized to retrieve the appropriate current nonpredictable coded value for such person. This value may then be compared against the remainder of the received bits. Again, a match signifies acceptance with a mismatch signifying rejection.

The foregoing and other objects, features and advantages of the invention will be apparent from the following more particular description of preferred embodiments as illustrated in the accompanying drawings.

IN THE DRAWINGS

FIGS. 2-1 and 2-2 are a low diagram illustrating the operation of a system operating in accordance with various embodiments of the invention.

DETAILED DESCRIPTION

Figure 1:
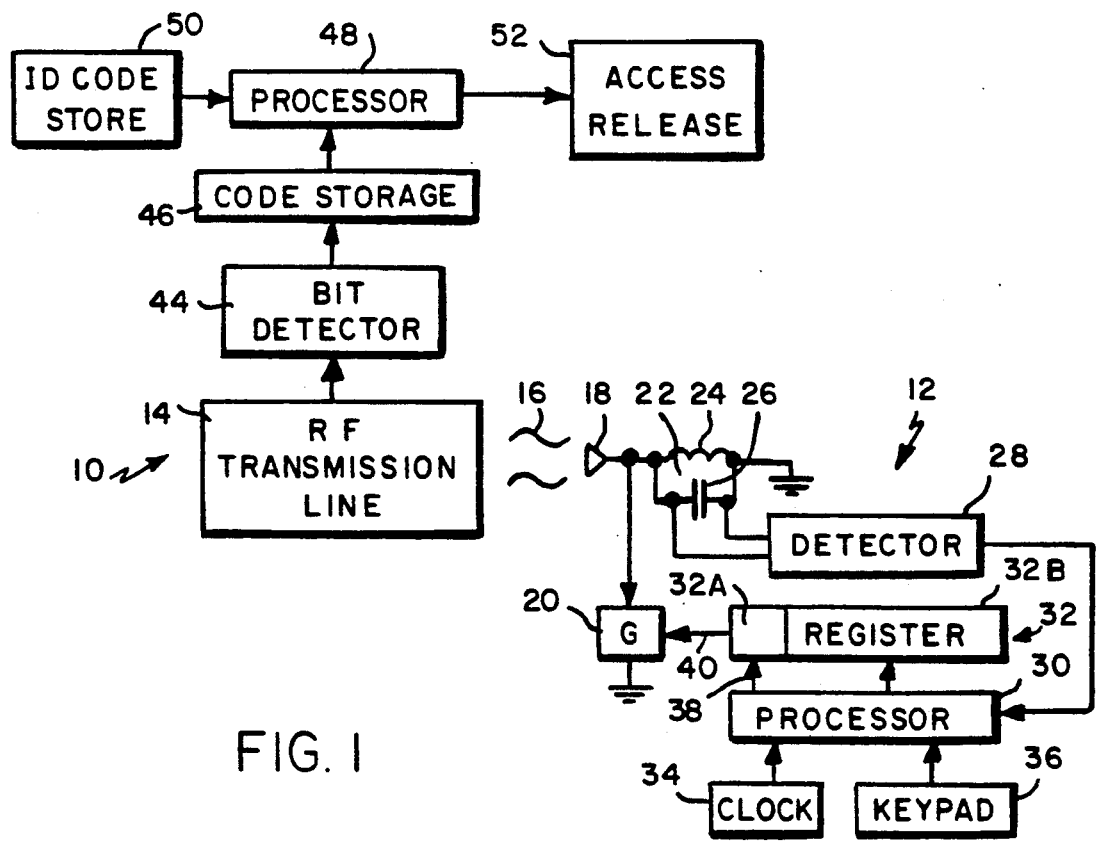
FIG. 1 is a schematic semiblock diagram of a system incorporating the teachings of this invention.

FIG. 1 shows an identification and/or verification system in accordance with the teachings of this invention. The system has a station 10 at which identification or verification is being performed and a unit 12 which is carried by the individual or person to be identified or verified. Station 10 could be a building, compound or other facility or any selected area thereof, could be an airplane, automobile or other vehicle or could be a computer or other piece of equipment which may be utilized or operated only by a selected person or persons. In any event, relatively high security is generally required in gaining access to station 10.

Unit 12 would typically be a card, badge or other token but could take other forms. For example, it could be embedded as part of a watch, pin, pen or other item or device worn or carried by the person. At the station 10, an RF transmission line 14, which includes an RF energy source, generates an RF field 16. Typically RF field 16 would be continuously generated. However, if desired, transmission line 14 may be energized to generate field 16 in response to the detection of an individual approaching station 10. The individual could be detected using standard technique such as a photodetector, pressure sensitive pad, or the like.

When the unit 12 gets close to the field 16, the field is picked up by antenna 18. The output from antenna 18 is applied as one input to gate 20 and is an input to a tank circuit 22 formed, for example, by coil 24 and capacitor 26. The values for coil 24 and capacitor 26 are selected such that the resonant frequency of tank circuit 22 is equal to the frequency of RF transmission line 14. Thus, when antenna 18 picks up RF field 16, the tank circuit 22 becomes a load on the transmission line causing the standing wave ratio of the transmission line to be reduced. The absorption of energy by tank circuit 22 also results in a charging of capacitor 26 which is detected by detector 28. Detector 28 may for example be a standard diode detector. The output from detector 28 is applied to processor 30 indicating that a beacon has been detected and the unit 12 is being scanned.

When the person or object to be identified receives the unit 12, a predetermined coded value unique to the person is stored in register 32. The value stored in register 32 may for example contain sixty-four binary bits which may represent sixteen decimal characters. For the preferred embodiment, the first six of these decimal characters stored in portion 32A of the register represent a public ID code for the user and are permanently burned into or otherwise stored in a register 32. The remaining bits, representing for example ten decimal characters, are stored in portion 32B of the register. These bits are changed at periodic intervals in accordance with a predetermined algorithm so that the code in portion 32B of the register at any given time is pseudorandom and nonpredictable. The manner in which such nonpredictable codes are generated is discussed in greater detail in the beforementioned U.S. Pat. Nos. 4,720,860 and 4,885,778.

Processor 30 has as inputs, in addition to the input from detector 28, an input from a real time clock 34 and inputs from a keypad 36. Clock 34 may for example indicate the current hour and minutes and the value in this clock may change every minute. Keypads 36 may for example be pressure sensitive pads representing the digit 0-9 which may be operated by the person to for example key in his secret PIN. The contents of area 32B of register 32 are also applied as an input to processor 30. Processor 30 has a predetermined algorithm stored therein which is secret and which, in response to the inputs from register 32B, clock 34 and, when present, keypads 36, generates at periodic intervals, such as each time there is a change in the minute value in clock 34, a new nonpredictable code which is stored in register 32B.

Gate 20 is normally open so that the RF field 16 received by antenna 18 is applied to tank circuit 22. However, when detector 28 applies a signal to processor 30, processor 30 generates a sequence of shift pulses on line 38 which cause successive bit positions in register 32 to be connected to gate input line 40. When a bit is present on line 40, gate 20 is enabled, shorting any RF signal received at antenna 18 to round. This prevents tank circuit 22 from presenting a load to RF transmission line 14. However, when no bit (i.e., a zero bit)

appears on line 40, gate 20 is disabled, permitting tank circuit 22 to receive the RF field signal and thus to load RF transmission line 14. Power for controlling processor 30, clock 34, and the other components of unit 12 may be provided by a suitable conventional battery (not shown).

The change in standing wave ratio in RF transmission line 14 caused by tank circuit 22 is detected by bit detector 44. Since gate 20 is normally open, there will be drop in the RF standing wave ratio as the unit 12 approaches the station. When the unit 12 is close enough to station 10 for tank circuit 22 to provide a predetermined load to the transmission line, detector 44 becomes operative. This would typically be at a distance of a few feet, although the exact distance will vary with the equipment used. To synchronize the station and the unit, detector 44 may, for example, have a greater range than detector 28 so that it is operative when detector 28 generates an output. The first bit in register 32 may always be a one so that a transition occurs in the absorption state of the unit when a shifting operation begins. Detector 44 may detect and sync on this transition, either alone or in combination with processor 48. Other standard synchronization technologies may also be employed including either one or both of the station and unit transmitting a sync code.

Once bit detector 44 determines that a unit 12 is shifting out a code, it starts loading bits into code storage register 46 at the same rate that shift pulses are being applied by processor 30 to line 38. Since the state of the standing wave ratio applied to detector 44 varies as a function of whether gate 20 is enabled or disabled during each such shift interval, and the state of gate 20 in turn varies as a function of whether a bit is present or not in the currently scanned position in register 32 the code stored in register 46 corresponds to the code stored in register 32 of the unit 12 being scanned.

The time required to scan register 32 is very short compared to the time between changes in values stored in register portion 32B, so that the contents of register 32 is easily scanned between change cycles of the values stored in register 32B. For example, it may take only 75 milliseconds to scan register 32 while the value in the register is changed only every minute. However, to avoid erroneous outputs, processor 30 will not typically change the contents of register 32 during a scan cycle. Further, the processor 48 at station 10 will always use the nonpredictable code for the time interval at which a scan began in order to determine a code match. Checksum or parity information may also be transmitted to insure system integrity and reliability, and in particular to protect against transmission errors.

When a code from unit 12 has been stored in storage 46, this code is applied to processor 48 which also receives stored ID codes from a store 50. The coded values inputted to processor 48 are compared in a manner to be discussed in greater detail later to either identify the individual with the unit or to verify the identity or validity of such individual. If identity is successfully established, processor 48 may generate an output to an access release mechanism 52 to, for example, permit a door or vault to be opened or to automatically open a door through which the person needs to pass.

While the embodiment of the invention shown in FIG. 1 operates satisfactorily, since it depends on a detection of change in standing wave ratio in RF transmission line 14 in order to transmit bit information, it requires that antenna 18 be relatively close to RF transmission line 14, for example less than a few feet, in order to function. In some applications, a system which operates with the unit 12 at a greater range from the station 10 may be desirable. Further, the embodiment of FIG. 1 also requires a beacon from transmitter 14 to trigger the unit 12 to present its code. In applications where station 10 is battery-powered, to reduce radiation exposure where many people pass the beacon who do not require access, to prevent spurious access release when a person with a unit who does not desire access passes the beacon or for other reasons, it may be desirable to trigger unit 12 without a beacon.

Figure 1A:
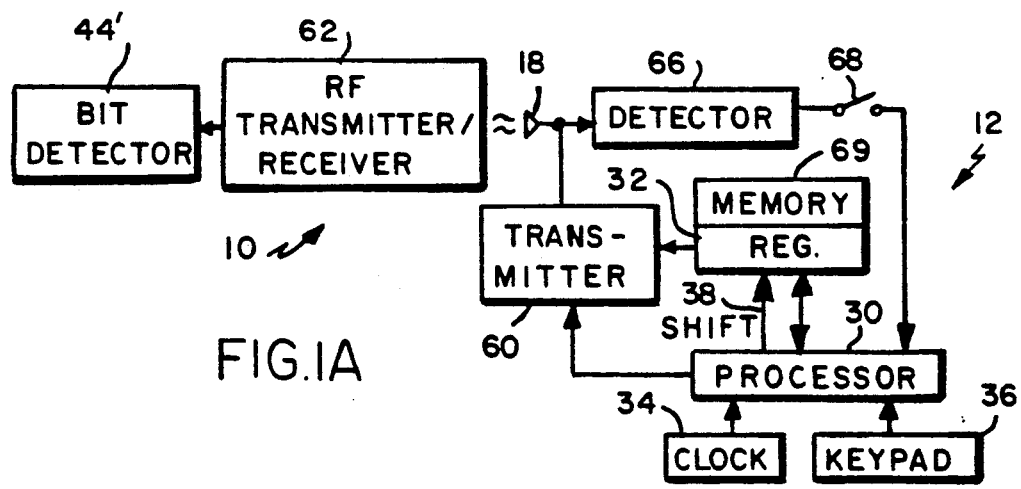
FIG. 1A is a schematic block diagram of a first alternative embodiment of the invention.

FIG. 1A therefore shows a circuit for an alternative embodiment of the invention wherein gate 20 is replaced by a transmitter 60 and RF transmission line 14 is replaced by an RF transmitter/receiver 62. Detector 66 in FIG. 1A is basically a combination of tank circuit 22 and detector 28 and is connected to processor 30 through a switch 68. The remainder of the circuit could be the same as for the circuit of FIG. 1.

For this embodiment of the invention, with switch 68 closed, detector 66 would still be utilized to trigger processor 30. However, before processor 30 starts delivering shift pulses to line 38, it would deliver a signal or pulses to line 64 enabling transmitter 60 to start generating an output, for example an RF output at a frequency different than the frequency of RF transmitter 62, which transmission is modulated, enabled or otherwise controlled by the bits being scanned from register 32. The modulated RF signal is picked by the receiver portion of circuit 62 and applied to bit detector 44' which syncs the station and unit and determines the state of each transmitted bit from the received signal, generally in the manner previously described. For example, processor 30 may cause transmitter 60 to generate a syncing code sequence before transmission of data from register 32 through transmitter 60 begins.

The range for the device shown in FIG. 1A would be limited only by the power available for transmitter 60 and could typically be several yards. The embodiment shown in FIG. 1 is generally preferable where there is no power available or required at the unit. However, since some type of battery would be required for processor 30, clock 34, probably register 32 and possibly other components of the unit 12, the same battery could also be utilized to operate a transmitter 60. Therefore, the embodiment of FIG. 1A is generally preferable since it provides greater range, more reliable transmission and reception, and an enhanced capability to provide syncing and error control information.

It is also possible to operate the embodiment of FIG. 1A without a transmitter at station 10 and without detector 66 at unit 12. For this non-beacon mode of operation, switch 68 would be open and circuit 62 would contain only an RF receiver. When the person approaching station 10 reached a point close enough to the station to be within range of transmitter 60, which point could be marked with a line on the floor, a sign on the wall or the like, the person would take appropriate action to trigger transmission by transmitter 60 of the code in register 32. For preferred embodiments, this would be done by touching an appropriate area or areas on keypad 36. For one embodiment of the invention, there would be a relatively larger area on the face of the unit, for example, the area covering one side of a badge under the person's photograph, or an area having a different tactile feel than the remainder of the unit or badge surface, which a person could easily touch when reaching the desired point. The touching of this area would be recognized by processor 30 and would generate the triggering output to transmitter 60 to produce syncing signals and any other desired control outputs and to also generate shift signals on line 38 to step the contents of register 32 to modulate transmitter 60. Once triggering of processor 30 has occurred, the coded output may be generated only a single time, the coded output may be generated two or more successive times to assure proper reception or coded outputs may be generated either continuously or periodically, for example, once every second for some period of time sufficient to enable the individual to get through all check points at a facility. The period of time required for this will be discussed in greater detail later in conjunction with the discussion of a PIN.

Triggering could also occur in response to the person inputting one or more characters, for example his PIN, on keypad 36. This mode of operation would typically be employed for triggering in the situation to be discussed later where the PIN is inputted in any event to enhance system security so that utilizing an inputted PIN for triggering would not result in any increased inputting burden on the user. Since this mode of operation involves more work on the part of the user, the system would be arranged so that the user need enter the PIN only once to gain access to the facility, with processor 30 interrogating and reading out the contents of register 32 and causing transmitter 60 to transmit, preferably at intervals, perhaps one second apart.

In addition to the non-beacon triggering modes discussed above which occur in response to some input from the user, in applications where outputs from the unit are scanned repetitively, for example, where the unit is being used by a night watchman in an application to be described later, it may be desired to have triggering occur solely in response to a clock output from clock 34 without either a beacon or user involvement. Thus, for example, processor 30 might cause a transmission from transmitter 60 of coded bits in response to each minute change input from clock 34. Other modes of triggering the unit might also be possible.

FIG. 1A also illustrates another option which may enhance security, or otherwise enhance the usefulness of the system of this invention. This feature is represented by memory 69 which may, for example, contain personal information on the person which could be utilized to assure that the person carrying the unit is the person to whom it was issued, or could contain information such as the person's access code to the computer so that the computer could be automatically set up and ready for the individual when the person sits down rather than having to key this information in. The information in memory 69 would also be shifted out to transmitter 60 to be sent to station 10.

Figure 1B:
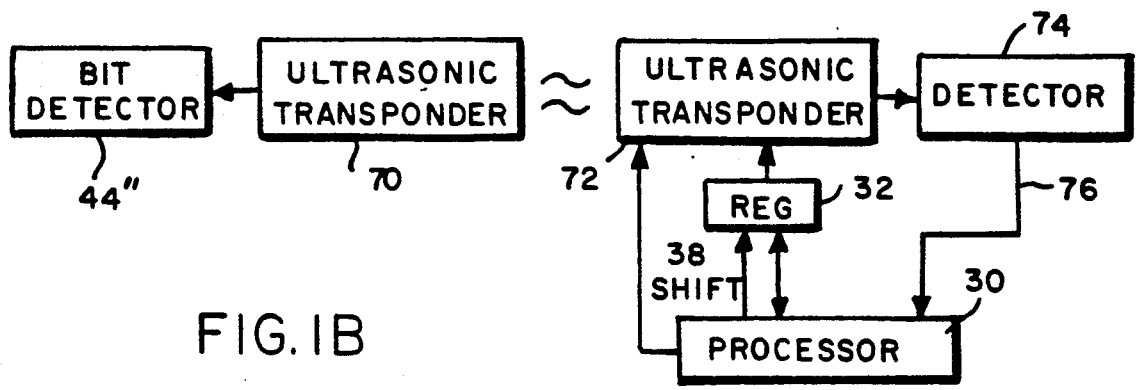
FIG. 1B is a schematic block diagram of a second alternative embodiment of the invention.

FIG. 1B shows another alternative embodiment of the invention wherein ultrasonic signals rather than RF signals are utilized to transmit information between the station 10 and unit 12. Thus, for this embodiment of the invention, RF transmitter/receiver 62 is replaced with an ultrasonic transponder 70 which may, for example, be a piezoelectric crystal generating an output at a predetermined ultrasonic frequency. Antenna 18, tank circuit 20, and transmitter 60 are similarly replaced by an ultrasonic transponder 72. The output from the ultrasonic transponder 72 is applied to an ultrasonic detector 74 which, in response to the detection of a signal at the frequency from transponder 70 generates an output on line 76 to processor 30 indicating that the unit 12 is being scanned. Processor 30 then enables transponder 72 to start transmitting any control and/or sync bits and the shifted outputs from register 32.

While in FIG. 1B, the transponders 70 and 72 have been indicated as being ultrasonic transponders, the invention may also be practiced utilizing transponders (or transmitters and receivers as appropriate) for frequencies in other portions of the electromagnetic spectrum, for example, gamma rays, X-rays, or the like. While it may require the user to hold the unit up to be scanned, rather than merely wearing or carrying the unit, it may also be possible to practice the invention using visible light, infrared or the like. Further, while for the preferred embodiments of the invention described above, the transponders 70 and 72 are both operated in the same frequency band of the electromagnetic spectrum, this is also not a limitation on the invention, and there may be applications where it is desirable for the transponders to operate in different frequency bands with, for example, the station transmitting RF energy and receiving ultrasonic energy, with the unit receiving the RF energy and responding thereto while transmitting in the ultrasonic frequency band. Finally, either with an ultrasonic transponder or with other type of electromagnetic radiation, it is possible to operate in the manner described in conjunction with FIG. 1A without a beacon, with triggering of code transmission being in response to an appropriate user or other triggering input.

Figures 1, 2:
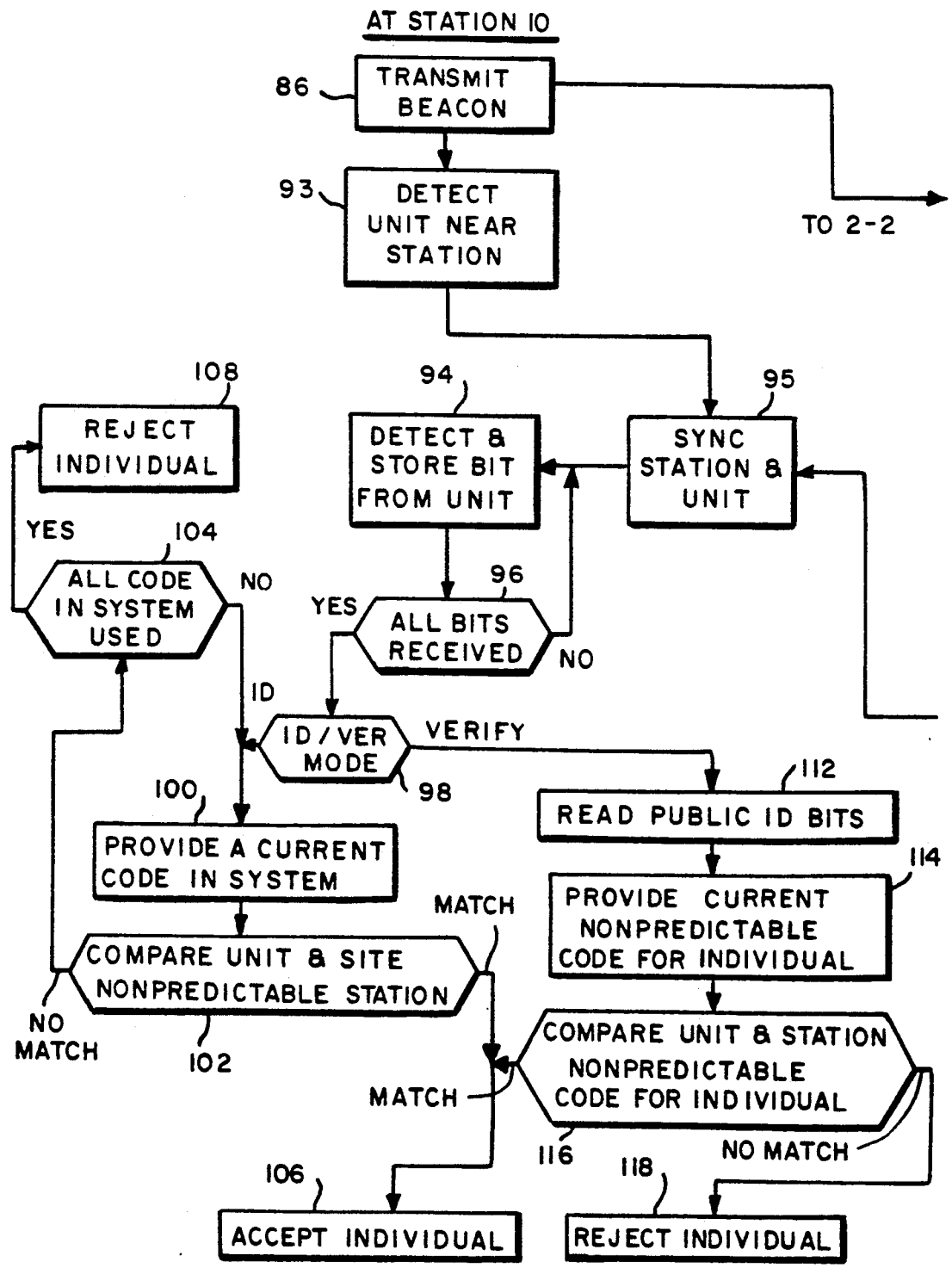
Figure 2:
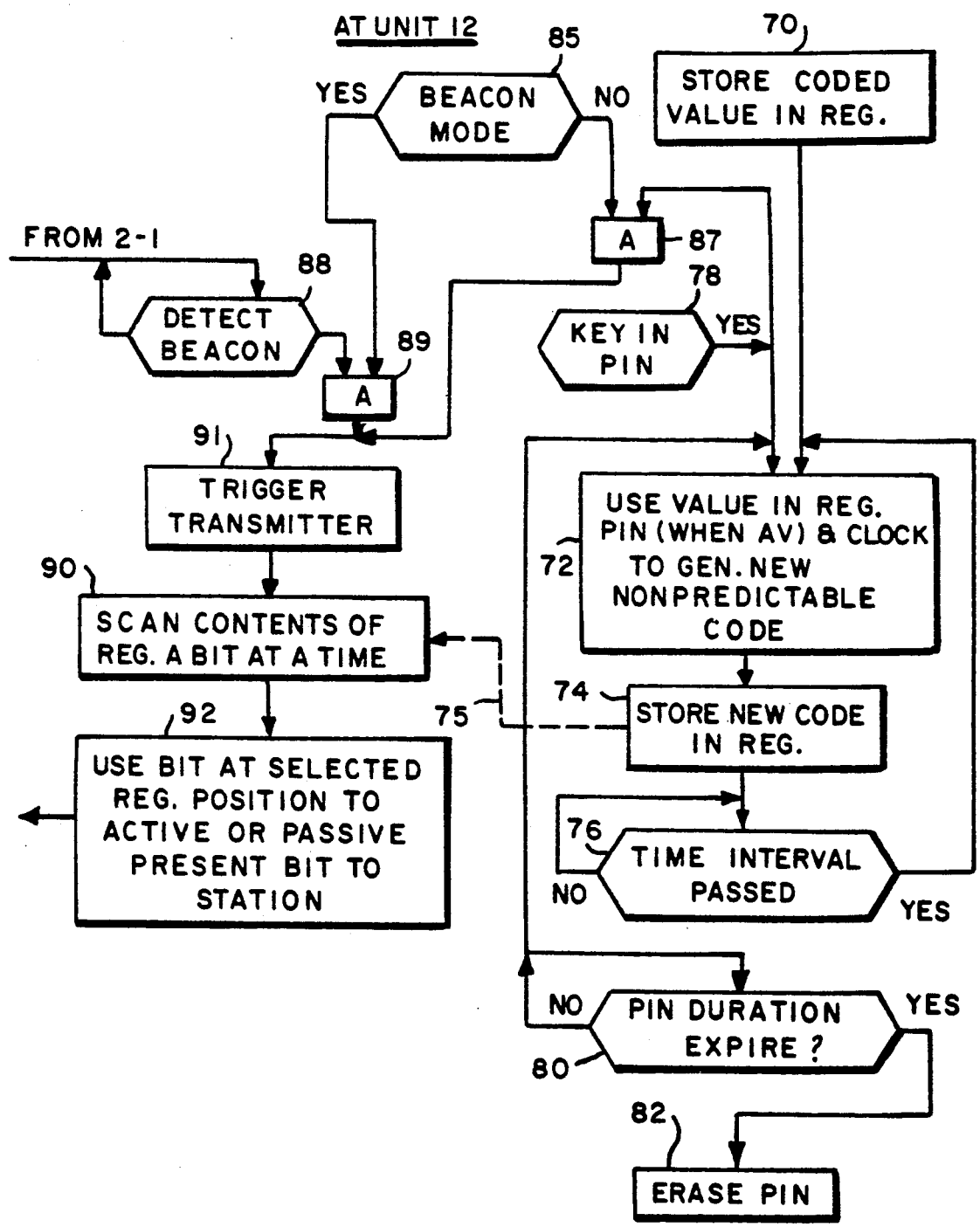

FIG. 2 is a flow diagram illustrating the operation of a system of the type shown in FIGS. 1, 1A and 1B. Referring to the right hand side of this figure, it is seen that initially a coded value is stored in register 32 during step 70. This is done when the unit is issued to the person or before. No later than the time the unit 12 is issued, the unit is also activated so that clock 34 starts operating, and the time the unit starts operating is recorded at station 10. Where there is more than one station 10 where a unit may be utilized, required information would be recorded at all such stations. As indicated previously, all of the coded value in register 32 may be subject to change by processor 30. However, for the preferred embodiment, a portion 32A of this register contains a fixed public identification code which is not changed by processor 30 and is utilized in the amount to be discussed shortly.

The stored coded value in register 32 is applied to processor 30 and, during step 72, is utilized in conjunction with the clock signal from clock 74 to generate a nonpredictable code which is stored at least in portion 32B of register 32. The manner in which this nonpredictable code is generated is discussed in greater detail in the beforementioned United States patents. During step 74, the new code generated by processor 30 at each time interval is stored in register 32, or at least portion 32B thereof, replacing the previous values stored therein. As is indicated by dotted line 75, this coded value is used during the identification or verification operations to be discussed later. During step 76, the system checks to determine if the time interval between updates to the nonpredictable code has occurred and, when the time interval has passed, steps 72, 74 and 76 are repeated with a new clock value.

This sequence of operations continues until the person in possession of the unit 12 approaches the station 10. At that point, for the embodiment disclosed, the person keys in his PIN, which may for example be a predetermined three to six digit number, on keypad 36. The keying in of the PIN is detected during step 78 and the keyed in PIN value is utilized by processor 30 during step 72, in addition to the stored coded value and the clock value, in generating the new nonpredictable code. The new nonpredictable code may be generated when the PIN is keyed in or at the next clock interval. In the later event, the person should key in the PIN when he is at least one minute away from station 10 so that the value stored in register 32 when he reaches the station and is scanned includes the PIN value. This is important since, as will be discussed shortly, the station will respond to the generated nonpredictable code only if such code includes the PIN in the generation thereof.

As was previously discussed, one reason for keying in the PIN is so that someone cannot gain access to the facility with a lost or stolen unit 12, since the person having such unit would not know the person's secret PIN, and the code being generated by unit 12 would therefore not be the proper code for admittance. However, in order for this objective to be achieved, the PIN must not remain in the unit on a permanent basis. However, in order to enable the person to pass through a number of checkpoints without requiring the rekeying of the PIN at each such checkpoint, it is desirable that the PIN remain in the unit long enough to afford the person full access to the facility. These objectives are achieved in accordance with the preferred embodiment of the invention by having the PIN remain in the unit 12 (i.e., in a predetermined storage location in processor 30) for a predetermined duration which is long enough to normally permit the person full access to the facility. Thus, once a PIN has been inputted and detected, processor 30 starts counting down a predetermined duration, for example by setting a predetermined value in a register and counting that value down during selected clock intervals. During step 80, a determination is made as to whether the predetermined duration has expired. If the duration has no expired, the PIN remains in the unit for use in generating the nonpredictable codes and the system continues to check to see if the duration has expired. When the PIN retention duration expires, the system proceeds to step 82 to erase the PIN or otherwise remove the PIN from the unit 12. Thus, the security of the system is maintained, with two independent factors, something known and something possessed, being required for identification and authentication. It should, however, be noted that while a PIN is utilized for FIG. 2, this is not, as previously indicated, a lamination on the invention.

During step 85, a determination is made as to whether the system is operating in a beacon mode or in a non-beacon mode for triggering. If the system is operating in a non-beacon mode, this enables the AND gate 87 to pass a keyed in PIN to processor 40. This is the equivalent of switch 68 being open. Conversely, if the system is in a beacon mode, then during step 86, a suitable beacon is transmitted at station 10 which is detected at unit 12 during step 88. Transmission of the beacon may, as previously indicated, be either continuous or in response to the detection of an person approaching the station. The system being in beacon mode enables AND gate 89 to pass an output when a beacon is detected. The outputs from AND gates 87 and 89 are the triggering inputs, the appropriate one of which is applied to trigger transmitter 60 or 70 during step 91 for embodiments where a transmitter is utilized. As previously indicated, triggering may also occur in response to a clock or other suitable input. From step 91, the operation proceeds to step 90.

Either in response to some detection that a person is approaching the station or in response to a detection by detector 44, the station detects the approach of a unit 12 (step 93), thus enabling the syncing of the station and unit (step 95). When triggering occurs, processor 30 causes the contents of register 32 to be scanned a bit at a time during step 90. Register 32 may be scanned in a number of known ways. During step 92, the next step in the operation, the bit at the currently scanned register position begins to control either gate 20 to passively present the bit to station 10 or to modulate transmitter 60 or 70 to actively transmit or present the bit to station 10. During step 95, station 10 syncs on the transition caused by the first bit, this bit being selected, as previously indicated, to cause such transition, or the station and unit are synchronized in some other standard manner.

During step 94, which is performed at the station, detector 44 or 44' detects and stores the bit received from the unit. The operation then proceeds to step 96 to determined whether all bits from register 32 have been received. Since the number of bits stored in register 32 is known, this is a simple determination which again can be accomplished by counting down a preset value or by other standard means. If all bits have not been received during step 96, the operation returns to step 94 to detect and store the next bit. When, during step 96, it is determined that all bits have been received, the operation proceeds to step 98.

For purposes of illustration, the system in FIG. 2 is shown as having two different modes of operation, namely an identification (ID) mode and a verification mode. In the ID mode, public bits are not provided in section 32A of register 32 and processor 48 functions to compare the received nonpredictable code with the current nonpredictable code for each person in the system. In the verify mode, the public ID bits are present, permitting the system to select the current nonpredictable code for the person and to compare this code with the received code. For purposes of illustration, both modes of operation are shown as being available in FIG. 2 although, in a typical system, only one or the other of such modes of operation would generally be present. During step 98 a determination is made as to which mode the system is operating in.

Assume initially that the system is operating in the ID mode. In this mode, the system proceeds from step 98 to step 100 during which a current code in the system is provided to processor 48. In order for the processor to function in this mode, it is necessary that it update all of the values in ID code store 50 during the same time intervals that codes are updated by processor 30, so that the values stored in ID code store 50 are always the current coded values for each person in the system. Since each update operation can be accomplished in a few milliseconds by existing processors, this requirement does not impose a serious limitation so long as the number of persons in the system is not excessively large.

During step 102, the coded value from ID code store 50 is compared in processor 48 with the received coded value stored in register 46. If these two coded values do not match, the operation proceeds to step 104 during which a determination is made as to whether all codes in store 50 have been used. If all codes in store 50 have not been used, the operation returns to repeat steps 100, 102 and 104 for a new coded value from store 50.

This sequence of operations continues until either, (a) during step 102, a match is obtained, in which event the system proceeds to step 106 to accept the person and to for example activate access release 52; or (b) if no matches are obtained during step 102, and during step 104 it is determined that all codes in the system have been used, the operation proceeds to step 108 to reject the individual seeking access with the unit 12. Step 108 would normally involve denying access to the facility or other station and might also trigger an alarm to alert a guard or other individual that someone is seeking to improperly gain access to the facility.

If a person is rejected, it may merely means that he has not entered his PIN or that he has been sufficiently delayed in entering the facility so that his PIN duration has expired and the PIN has been erased. Another potential problem which might lead to rejection is the problem discussed in U.S. Pat. No. 4,885,778 where the clock 34 at the unit becomes slightly out of synchronization with the clock at the station. A method for solving this problem is discussed in the prior patent, and the technique discussed in this patent may also be utilized in conjunction with this invention to avoid spurious rejections.

Two other potential problems exist, particularly when operating in the ID mode. The first is that, since the codes are nonpredictable, it is possible that at a given time interval the same nonpredictable code may exist for two or more individuals in the system. Thus, even though a match is obtained during step 102, it may still be desirable to continue comparing the code in storage 46 with the codes in store 50 to be sure that a second match does not occur, thereby assuring that the individual has been correctly identified. If a second match does occur, rather than rejecting or falsely identifying the individual, the identification may be delayed for the standard time interval, for example one minute, until the code in the unit changes so that a second check can be made. The likelihood of two individuals having the same nonpredictable code for two successive time intervals is so infinitesimally small as to be almost non-existent, and this would permit a unique identification of the individual.

A second possibility is that, with a reasonably large number of individuals in the system, a person may be correctly identified even though he inputted the wrong PIN and should be rejected. While there is a possibility of this occurring, with sixty four bits, the number of potential code combinations is $2^{64}$, so that even with one thousand individuals in the system, the likelihood of a false hit (i.e., a false positive or so called "type 2 error") is very low. The verification mode to be now described virtually eliminates the possibility of a false hit occurring.

If during step 98 it is determined that the system is in a verification mode, the operation proceeds from stop 98 to step 112 during which the public ID bits portion of the received code, the portion of the code stored in register portion 32A, is looked at by processor 48. This code may be used as an address to access memory 50 to obtain a code for that person. If memory 50 is continuously updated so that the values stored in the memory are the current nonpredictable codes for the person, then this is the value retrieved from memory 50. However, if these values are not continuously updated, the originally inputted code or last updated code for the individual could be retrieved and processed, using the last known code and the known time since the last update, to obtain the current nonpredictable code for the person. These operations are performed during step 114. During step 116, the next step in the operation, the current nonpredictable code for the person obtained from processor 48 is compared with the current nonpredictable code in store 46 from unit 12. If these codes do not match, the individual is rejected during step 118, while if these codes match, the person is accepted during step 106. The operations and options during either acceptance or rejection would be the same as those previously described when in the ID mode.

In the discussion so far it has been assumed that all of the its in register 32 are code bits used for identifying the individual. However, in a system, one of more of these bits may be used as checksum or parity bits to be sure that the code generated is is a valid code and to protect against transmission errors. Thus, after step 96 in the operation, a checksum or parity check might be performed. If the received code were determined to be invalid, the code could be reread during the same or a subsequent time interval, or other appropriate action taken. Further, while RF transmission and reception has been utilized for the preferred embodiment of the invention, and ultrasonic transmission and reception are shown for an alternative embodiment, it is apparent that the objects of this invention, particularly for the embodiments of the invention shown in FIGS. 1A and 1B, could be achieved using other forms of radiation from the transmitter at the station and other types of radiation detection. Thus, the transmitter could be generating a low level ultrasonic signal, a low level microwave signal, or any other type of radiation which could be easily detected at unit 12. Similarly, transmitter 60 could be generating information as bursts of energy at something other than the RF frequency or could be modulating something other than an RF signal.

Further, while for the preferred embodiment the system is being used to control passage into a secure facility, into a vault, or the like, with a number of transmitters and receivers positioned at strategic locations throughout a facility, the system could also be utilized to passively monitor the location of person throughout the facility. For example, a watchman having a unit 12 could walk through the facility and have the system record centrally his passing each desired checkpoint, rather than utilizing the current more cumbersome clock system. In any system where there are multiple checkpoints at a station, a single processor 48 and stores 46 and 50 would normally be shared by all checkpoints. Since the system could also identify individuals entering and leaving a facility, it could eliminate the need for attendance time clocks. It could also be used in a variety of other applications where secure identification or verification of individuals is required.

Finally, while in FIGS. 1A and 2 the system is shown as being operative in either a beacon or non-beacon mode, this is primarily for purposes of illustration, and typically a system would operate in either one mode or the other.

Thus, while the invention has been particularly shown and described above with reference to preferred embodiments, the foregoing and other changes in form and detail may be made therein by one skilled in the art without departing from the spirit and scope of the invention.

What is claimed is:

1. A personal identification system comprising:

a unit to be carried by a person to be identified, said unit containing, means for storing a predetermined coded value, means for changing at least a predetermined portion of the coded value at predetermined time intervals in accordance with a predetermined algorithm, the algorithm being such that the value of said predetermined portion of the stored coded value at any given time is nonpredictable, means for producing a triggering signal, and means responsive to said triggering signal for causing an indication of the current stored coded value to be automatically produced in a predetermined sequence; and a station having means automatically responsive to the produced coded value sequence for identifying the person who is to be carrying the unit.

2. A system as claimed in claim 1 wherein said station includes means for transmitting a beacon; and
   wherein said triggering signal producing means includes means for detecting said beacon.

3. A system as claimed in claim 2 wherein said means for transmitting is an RF signal source, and wherein the means for detecting is responsive to the RF signal.

4. A system as claimed in claim 2 wherein said RF signal source transmits at a predetermined frequency, and wherein said means for detecting includes a tuned circuit which absorbs energy at said predetermined frequency.

5. A system as claimed in claim 4 wherein said coded value is stored as a plurality of binary bits, and wherein said means for causing an indication includes means responsive to the RF signal detection for causing the bits of said stored coded value to be sequentially presented, and means responsive to the presented bits of said coded value for controlling the absorption state of said tuned circuit.

6. A system as claimed in claim 4 wherein said unit includes transmission means, wherein said coded value is stored as a plurality of binary bits, and wherein said means for causing an indication includes means responsive to said RF signal detection for causing the bits of said stored coded value to be sequentially presented, and means responsive to the presented bits of the coded value for controlling the output from said transmission means.

7. A system as claimed in claim 1 wherein said means for transmitting is an ultrasonic signal source, and wherein the means for detecting in the unit is responsive to said ultrasonic signal.

8. A system as claimed in claim 1 wherein said means for identifying includes means providing a current coded value for each person on the system, means for detecting and storing the current coded value indication produced by the unit, means for comparing the stored current value indication against each provided current coded value, and means responsive to a match between a provided current coded value for a person and the stored current value indication for identifying the person.

9. A system as claimed in claim 1 wherein the system controls access to or through a checkpoint; and
   including means responsive to the identification of the person for permitting access through the checkpoint.

10. A system as claimed in claim 1 wherein the system tracks the location of the person at a facility, and including a plurality of produced coded value responsive means selectively located at the facility.

11. A system as claimed in claim 1 wherein said unit contains a clock means the value of which changes at at least said predetermined time intervals, said algorithm utilizing said clock value and at least a portion of the current stored coded value to generate a new nonpredictable stored coded value.

12. A system as claimed in claim 1 wherein said unit contains a keypad with selected characters which the person may utilize to key in a unique PIN code, and wherein said means for changing utilizes the keyed in PIN in generating the nonpredictable current stored coded value.

13. A system as claimed in claim 12 wherein a predetermined subset of the stored coded value is a public ID code for the person which is not changed by said means for changing; and
   wherein said means for identifying includes means responsive to the produced public IC code for providing the current nonpredictable code for the person, means for comparing the provided nonpredictable code with the produced nonpredictable code, and means responsive to a match between the two nonpredictable codes for both identifying and verifying the person.

14. A system as claimed in claim 12 including means for storing said PIN for a predetermined duration, the PIN being removed from the unit at the end of said duration.

15. A system as claimed in claim 12 wherein said triggering signal producing means includes means responsive to the keyed PIN for generating the triggering signal.

16. A system as claimed in claim 1 wherein said unit includes a keypad, and wherein said triggering signal producing means includes means responsive to a predetermined keypad input for generating the triggering signal.

17. A system as claimed in claim 16 wherein said keypad input is a unique coded input.

18. A system as claimed in claim 16 wherein said keypad input is from a selected keypad area.

19. A system as claimed in claim 1 wherein said triggering signal producing means includes means for automatically generating triggering signals at selected time intervals.

20. A system as claimed in claim 1 including means for synchronizing said means for causing an indication to be produced and said means for identifying.

21. A method for identifying a person comprising the steps of:
   storing a predetermined coded value at a unit carried by the person, changing at least a predetermined portion of the coded value at predetermined time intervals in accordance with a predetermined algorithm, the algorithm being such that the value of said predetermined portion of the stored coded value at any given time is nonpredictable, producing a triggering signal at the unit and causing the indication of the current stored coded value to be automatically produced in response to the triggering signal; and
   at a station where the person is to be identified, detecting an indication of the produced coded value, and automatically identifying the person who is to be carrying the unit in response to the detected produced coded value.

22. A method as claimed in claim 21 wherein the identifying step includes the steps of providing a current coded value for each person on the system, storing the current coded value indications produced by the unit, comparing the stored current value indications against each provided current coded value, and identifying the person in response to a match between a provided current coded value for a person and the stored current value indication.

23. A method as claimed in claim 21 wherein said unit includes a keypad; and
   wherein said producing a triggering signal step includes the step of producing the triggering signal in response to a predetermined keypad input.

24. A method as claimed in claim 21 wherein said triggering signal producing step is performed automatically at periodic intervals.

* * * * *